Patented Sept. 1, 1936

2,052,592

UNITED STATES PATENT OFFICE 2,052,592

DYESTUFFS OF THE ANTHRAQUINONE ACRIDONE SERIES AND PROCESS OF MAKING THEM

Alexander J. Wuertz, Carrollville, and Myron S. Whelen, Milwaukee, Wis., assignors to E. I. du Pont de Nemours & Company, Wilmington, Del., a corporation of Delaware No Drawing. Application August 9, 1935, Serial No. 35,484

6 Claims. (Cl. 260—37)

This invention relates to the preparation of new dyestuffs of the anthraquinone series, more particularly to compounds having the general formula

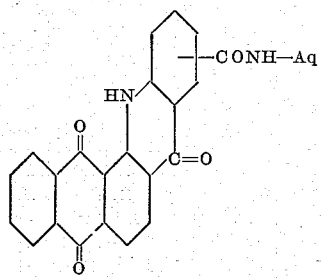

wherein Aq stands for an anthraquinone radical containing one or more hydroxy or methoxy groups.

This invention deals with dyestuffs which fall under the broad class of compounds disclosed in a patent to A. J. Wuertz, U. S. 1,989,904, and has for its object the preparation of new orange to red vat dyestuffs which have excellent fastness properties, using as one of the starting materials the anthraquinone-2,1N-benzacridone carbonyl chlorides disclosed in that patent. According to our invention, the anthraquinone-2,1N-benzacridone-Bz-carbonyl chlorides are condensed with an amino-anthraquinone compound containing hydroxy or methoxy groups in the alpha or beta positions. The hydroxy and methoxy groups impart desirable properties to this particular dyestuff, giving desirable shades of orange and red which have exceptionally good fastness properties. The anthraquinone-2,1N-benzacridone may contain the carbonyl chloride group in the ortho, meta or para position of the Bz ring relative to the nitrogen atom of the acridone nucleus. The condensation is carried out under the conditions described in U. S. 1,989,904 in the presence of organic solvents such as nitrobenzene, dichlorobenzene, etc.

The following examples are given to more fully illustrate our invention. Parts used are by weight.

Example 1

1.8 parts of anthraquinone-2,1N-benzacridone-Bz-p-carbonyl chloride (obtainable by condensation of 1-chloro-anthraquinone-2-carboxylic acid with p-amino-benzoic acid, followed by heating with phosphorus pentachloride in an inert organic solvent) are heated to 150° C. with 1.2 parts of 1-amino-4-hydroxy-anthraquinone in 20 parts of nitrobenzene until the formation of dyestuff is completed. After cooling, the reaction mixture is filtered and the dyestuff washed with nitrobenzene and alcohol. The dyestuff obtained which corresponds to the formula

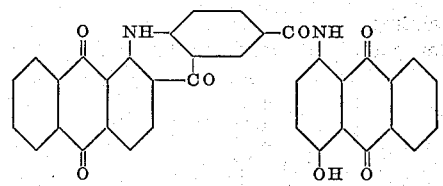

dyes cotton orange shades from a violet vat.

Instead of using 1-amino-4-hydroxy-anthraquinone, 1-amino-5-hydroxy-anthraquinone may be used in a similar manner. Also anthraquinone-benzacridone-ortho- and meta-carbonyl chlorides may likewise be condensed with the aforesaid amino-hydroxy-anthraquinones.

Example 2

2.4 parts of the chloride described in Example 1 are heated to 150° C. for a short time with 1.7 parts of 1-amino-4-methoxy-anthraquinone in 20 parts of nitrobenzene. The dyestuff is worked up in a manner similar to that described in Example 1.

It corresponds to the formula

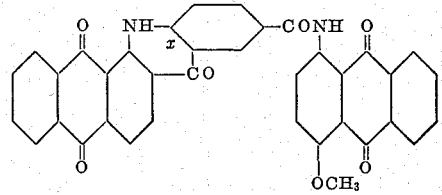

and dyes cotton reddish orange shades from a violet vat.

Instead of using 1-amino-4-methoxy-anthraquinone, 1-amino-5-methoxy-, 1-amino-6-methoxy- or 1-amino-8-methoxy-anthraquinone may be used.

Example 3

3.9 parts of anthraquinone-benzacridone-p-carbonyl chloride are condensed with 1.5 parts of 1,5-diamino-4,8-dimethoxy-anthraquinone and are heated to 150° C. for a short time in 20 parts of nitrobenzene. The dyestuff is worked up in a manner similar to that shown in Example 1. It dyes cotton bordeaux shades from a violet vat.

Anthraquinone-benzacridone-o- and m-carbonyl chlorides can be utilized in an analogous manner in any of the examples above given. Likewise these above mentioned carbonyl chlorides can be condensed with other diamino-anthraquinone-ethers, such as 1,5-diamino-4,8-dihydroxy-, 1,4-diamino-5,8-dimethoxy-anthraquinone, and the corresponding hydroxy bodies derived from these ethers. In all cases the resulting products dye in orange to red shades.

We claim:
1. Compounds of the formula

wherein Aq represents an anthraquinone radical containing at least one hydroxy or methoxy group.

2. The compound of the formula

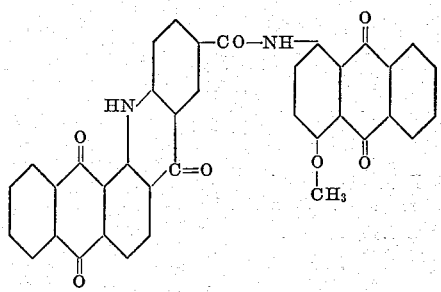

3. The compound of the formula

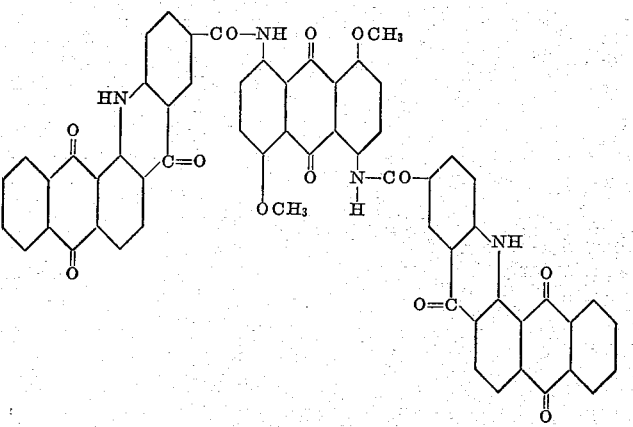

4. The process which comprises condensing an anthraquinone-2,1N-benzacridone - Bz - carbonyl chloride with an amino-anthraquinone containing a hydroxy or methoxy radical.

5. The process which comprises condensing anthraquinone - 2,1N - benzacridone-Bz-p-carbonyl chloride with 1-amino-4-methoxy-anthraquinone.

6. The process which comprises condensing two moles of anthraquinone-2,1N-benzacridone-Bz-p-carbonyl chloride with one mole of 1,5-diamino-4,8-dimethoxy-anthraquinone.

ALEXANDER J. WUERTZ.
MYRON S. WHELEN.